Aug. 21, 1951                O. R. SMITH                2,564,932
                          MOTOR VEHICLE DRIVE
Filed Sept. 30, 1948                                2 Sheets-Sheet 1

Inventor
Oliver R. Smith

By
Ahley & Ahley
Attorneys

Aug. 21, 1951 — O. R. SMITH — 2,564,932
MOTOR VEHICLE DRIVE
Filed Sept. 30, 1948 — 2 Sheets-Sheet 2
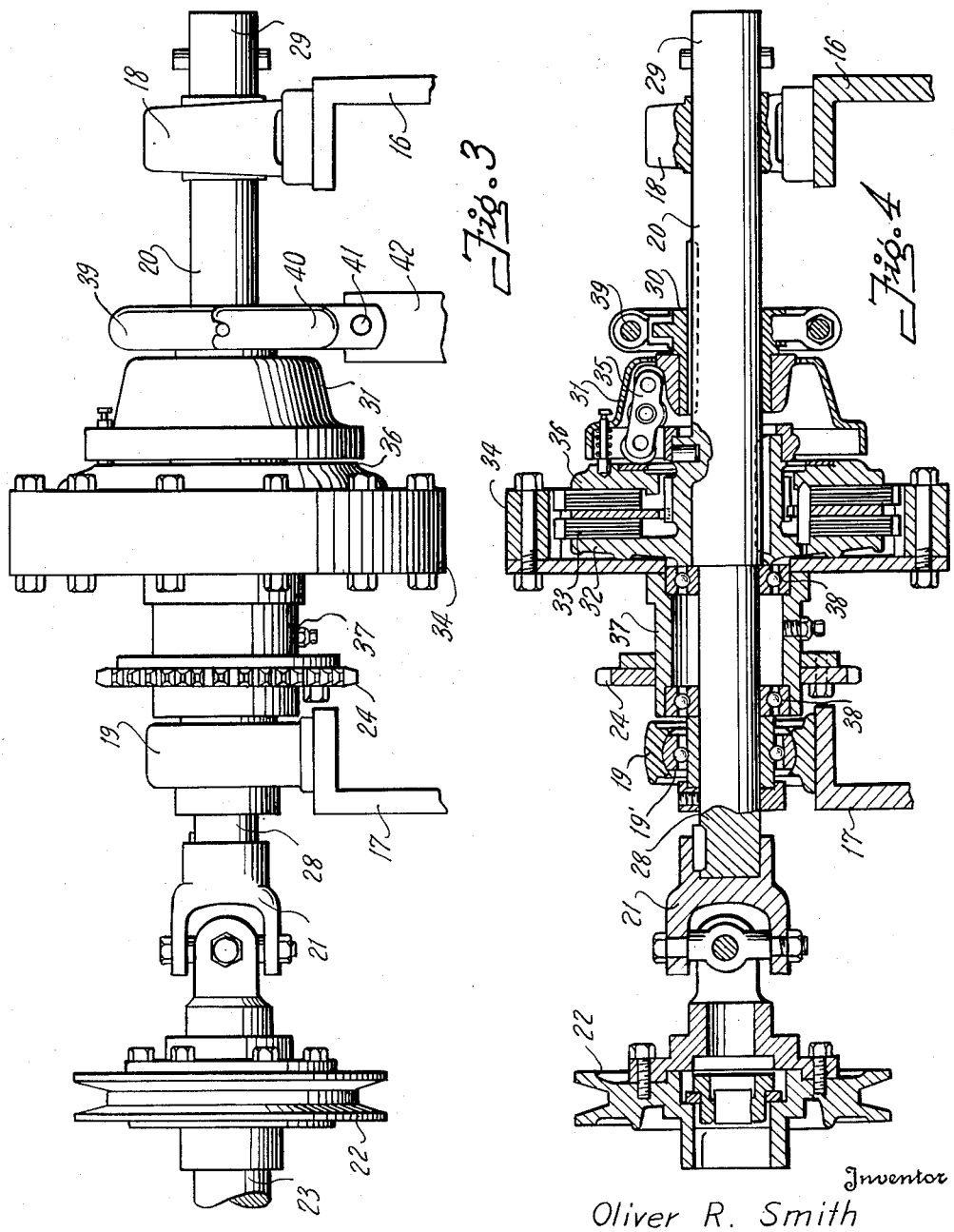
Inventor
Oliver R. Smith
By Ashley & Ashley
Attorneys Patented Aug. 21, 1951

2,564,932

UNITED STATES PATENT OFFICE 2,564,932

MOTOR VEHICLE DRIVE

Oliver R. Smith, Fort Worth, Tex.

Application September 30, 1948, Serial No. 51,913

2 Claims. (Cl. 74—15.63)

This invention relates to new and useful improvements in motor vehicle drives.

One object of the invention is to provide an improved drive for a motor vehicle.

Another object of the invention is to provide an improved vehicle drive wherein power is taken off the crankshaft of the engine at the front thereof whereby the rear end of the crankshaft is left free and may be used for other purposes.

A further object of the invention is to provide a vehicle drive including an auxiliary drive shaft having universal connection with the crankshaft of the engine so that the drive shaft can be mounted on the chassis frame, said shaft having a pair of members connected by a suitable clutch and a power take-off carried by one of said members.

A construction designed to carry out the invention will be hereinafter described together with other features of the invention.

Figure 1:
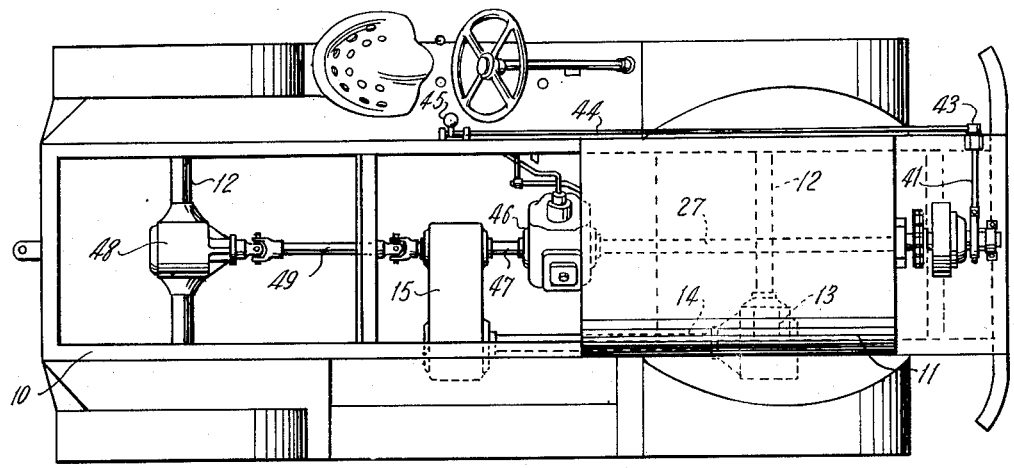
Figure 2:
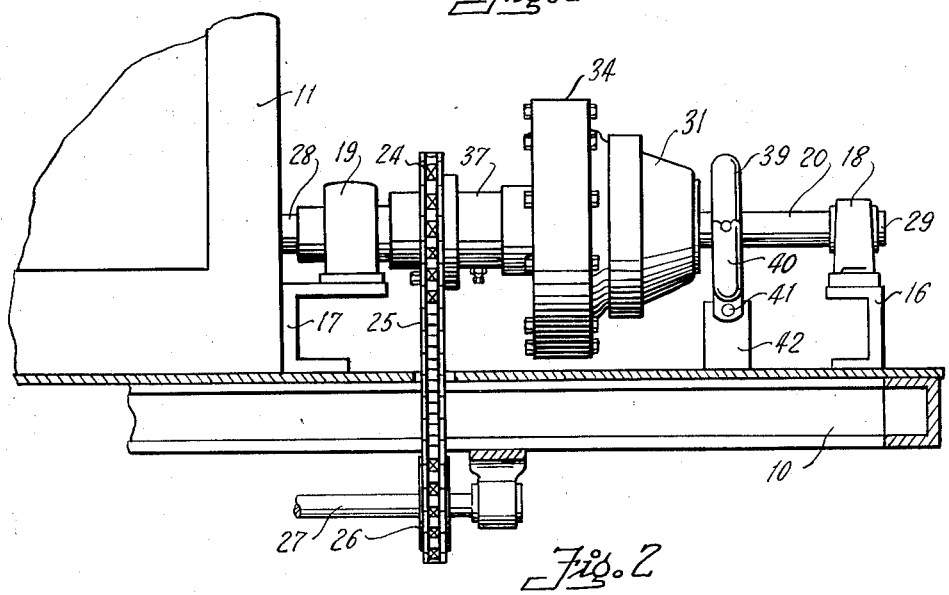

The invention will be more readily understood from a reading of the following specification and by reference to the accompanying drawings, wherein an example of the invention is shown, and wherein:

Fig. 1 is a plan view of a motor vehicle chassis having a drive constructed in accordance with the invention, Fig. 2 is a side elevational view of the drive, Fig. 3 is an enlarged, side elevation of the drive, and, Fig. 4 is a longitudinal, sectional view of the drive.

In the drawings, the numeral 10 designates the chassis frame of a motor vehicle having an engine 11 and axles 12. The front axle includes a differential 13 which is driven by a shaft 14 from a gear transfer box 15 suspended from one side of the medial portion of the frame 10. These parts are of standard construction.

On the front of the frame 10, a transverse channel bar 16 is secured and a similar bar 17, spaced therefrom, is secured across the frame immediately in front of the engine 11. Bearing boxes 18 and 19 are mounted on the medial portions of the bars 16 and 17 and have an auxiliary drive shaft, indicated generally by the numeral 20, journaled therein. If desired, the rear box 19 may have a self-aligning bearing assembly 19'. The shaft 20 projects rearwardly of the box 19 and is connected by a universal joint or coupling 21 to a drive pulley 22 which is mounted on the front end of an engine crankshaft 23. This arrangement permits independent movement of the engine and chassis frame. A sprocket wheel 24 surrounds the drive shaft 20 forwardly of the box 19 and is engaged by an endless chain 25 for driving a sprocket wheel 26. The latter is mounted on the front end of a countershaft 27, suitably journaled on the underside of the frame and connected to the gear transfer box 15.

The auxiliary drive shaft 20 includes a reduced rear section 28, to which the coupling 21 is attached, and a front section 29. A clutch collar 30 is splined on the section 29 and includes an actuator 31, while an annular clutch head 32 is fastened around the shaft section 29 and carries floating clutch plates 33 which are geared to a clutch housing 34. The actuator 31 has toggle levers 35 actuated by the collar 30 for reciprocating a clutch shoe 36 to engage or disengage the clutch plates. The clutch mechanism is old in the art and a detailed description is not considered necessary since its structure may vary.

The clutch housing 34 has a hub 37, carried by ball bearing assemblies 38 surrounding the reduced section 28 of the drive shaft, with the sprocket wheel 24 mounted thereupon. The front section 29 of the shaft is mounted in the bearing box 18 and the reduced section 28 is mounted in the bearing member 19'. The clutch collar 30 floats in a clutch ring 39 which is pivotally connected to a toggle arm or yoke 40 secured on a transverse rock shaft 41 journaled which is in a bracket 42 mounted on the frame 10. An arm 43 is provided at one side of the frame for rocking the shaft 41. The arm 43 is connected by a lever 44 to a hand lever 45 which is mounted on the side of the frame. By swinging the lever 45 the clutch may be operated to connect or disconnect the sprocket wheel 24 with the drive shaft 20, thereby controlling the transmission of power from the engine.

In Fig. 1, the counter-shaft 27 is illustrated as having driving connection with suitable transmission 46. A stub shaft 47 connects the transmission to the gear transfer case 15 which may have connection with the differential 48 of the rear axle through a conventional universal shaft 49. With this arrangement, the power take-off may be utilized to drive the rear and/or front axles for propelling the vehicle.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a motor vehicle drive, the combination with an engine crankshaft extending forwardly of the engine and a vehicle frame on which the engine is yieldably mounted, an auxiliary drive shaft extending forwardly of the crankshaft, a universal coupling connecting the front end of the crankshaft and the rear end of the drive shaft, the drive shaft having a reduced rear end portion to which the coupling is attached, a self-aligning bearing mounted on the frame, the reduced end of the drive shaft being mounted in said bearing, a bearing member in which the forward end of the drive shaft is mounted, a clutch housing mounted to revolve around the drive shaft, a hub extending rearwardly from the clutch housing to the self-aligning bearing and surrounding the reduced end of the drive shaft, the housing and hub being mounted on antifriction bearings carried by the reduced end of the drive shaft, a sprocket surrounding and secured to the hub, clutch members carried by and revolved by the drive shaft within the clutch housing, and an actuator mounted on the drive shaft and connected with the clutch members in rear of the bearing member at the forward end of the drive shaft.

2. A motor vehicle drive as set forth in claim 1, with a countershaft journaled on the frame and having a sprocket wheel fastened thereon, and a sprocket chain connecting the last named sprocket wheel with the sprocket surrounding the hub.

OLIVER R. SMITH.

REFERENCES CITED

The following references are of record in the file of this patent:

UNITED STATES PATENTS

| Number | Name | Date |
|---|---|---|
| 1,326,557 | Wilson | Dec. 30, 1919 |
| 1,887,355 | Kranick | Nov. 8, 1932 |
| 1,888,951 | Holland | Nov. 22, 1932 |
| 2,027,638 | Forsberg et al. | Jan. 14, 1936 |

FOREIGN PATENTS

| Number | Country | Date |
|---|---|---|
| 16,066 | Great Britain | Apr. 10, 1913 |
| 63,407 | Austria | Feb. 10, 1914 |